United States Patent [19]

Fraser, Jr. et al.

[11] Patent Number: 4,693,636
[45] Date of Patent: Sep. 15, 1987

[54] PIPELINE PULL-IN METHOD AND APPARATUS

[75] Inventors: Thomas A. Fraser, Jr., Ventura, Calif.; Andrew R. Macfarlane, London, England

[73] Assignee: Vetco Gray Inc., Houston, Tex.

[21] Appl. No.: 221,594

[22] Filed: Dec. 31, 1980

[51] Int. Cl.$^4$ .............................................. F16L 1/04
[52] U.S. Cl. ..................................... 405/169; 166/347
[58] Field of Search ................ 405/169, 195; 166/343, 166/344, 347, 362; 285/24, 27

[56] References Cited

U.S. PATENT DOCUMENTS 3,846,992  11/1974  Liautaud .......................... 166/347 X
4,133,182  1/1979  Chateau ............................... 405/169
4,294,471  10/1981  van Bilderbeek ..................... 285/24

Primary Examiner—Cornelius J. Husar
Assistant Examiner—Nancy J. Stodola
Attorney, Agent, or Firm—Edward L. Kochey, Jr.

[57] ABSTRACT

A template (26) attached to an anchor pile (12) supports a pull-in tool receptacle (28) at a predetermined location with respect to the anchor pile. The end of the pipe to be connected includes a riser mandrel (16), the lock down connector (20), and a buoyancy module (52). A bridle (42) is temporarily connected (44, 48, 50) to the end of the pipe with the pull-in cable threaded through a pull-in tool (30) and attached to the bridle.

The pull-in tool is locked (32) in the frame, and engages and secures alignment pins (40) attached to the bridle when the line has been pulled in. The pipe end is moved (59) into locked engagement with the anchor pile, the bridle (42) disconnected from the pipe end, and thereafter retrieved to the surface with the pull-in tool (30).

18 Claims, 2 Drawing Figures

4,693,636

PIPELINE PULL-IN METHOD AND APPARATUS

BACKGROUND OF THE INVENTION

The invention relates to offshore oil production and in particular to a method and apparatus for pulling in and anchoring a pipeline for a production riser system.

A production riser system will include a central riser with a plurality of peripherally located production risers. The production risers are used to produce oil to a surface location where it is treated and sent down through the central riser to a sales line for delivery of the oil. The central riser is connected to an anchor pile and must withstand all of the forces imposed on the production riser system. This riser will normally include a spool piece or mandrel with a flow connection being teed off of the central riser and provided with a pipe connection a short distance from the central riser.

This requires that the sales line be pulled in and remotely connected at this pipe joint. Apparatus for remotely making this connection has proved to be cumbersome and complicated, with the consequent diminished confidence in its reliability of operation.

Arrangement of pull-in apparatus to locate the pipeline at a precise location, while this apparatus takes the required pull-in loads has also proven to be difficult.

According to the invention, the remote connection adjacent the riser is eliminated; and the pipeline may be precisely located with low forces imposed on the pull-in structures.

SUMMARY OF THE INVENTION

The end of a sales pipeline to be attached to a sales riser anchor pile has a sled attached to the end. This sled includes a sales riser mandrel with the upper end being the end of the pipeline itself. The lower end of the mandrel carries a connector which is to be connected to the sales riser anchor pile. A 90 degree elbow is included connecting the upper end of the sales riser mandrel to the remainder of the pipeline. The sled also includes a buoyancy module to provide approximately neutral buoyancy for the structure as it is being pulled in.

A pull-in cable is threaded through a pull-in tool and attached to a bridle which is in turn attached to the pull-in sled at the surface. The pull-in tool is lowered into a pull-in tool supporting framework. This framework is held a predetermined distance from the anchor pile by a template structure, whereby the pull-in tool may be lowered and latched into the support structure at a predetermined location with respect to the anchor pile. The pull-in tool includes alignment funnels through which the pull-in cable is threaded.

The bridle includes alignment pins adapted to mate with the funnels with the cables being attached to these alignment pins. The bridle being temporarily attached to the sled is pulled into the alignment funnels, thereby locating the sled structure slightly above the anchor pile. The alignment pins are held within the funnels by spring loaded latches, so that the pull-in cable may be slacked off. Stroking cylinders on the pull-in tool lower the sled assembly so that the lower connector thereon engages the anchor pile. Hydraulic stab connections are provided between the pull-in tool and bridle which are in fluid communication with hydraulic stab connections between the bridle and the sled. Through these connections the lower connector is locked to the anchor pile.

The bridle is then hydraulically disconnected from the sled and carried to the surface with the pull-in tool as it is retrieved.

DESCRIPTION OF THE PREFERRED EMBODIMENT

Figure 1:
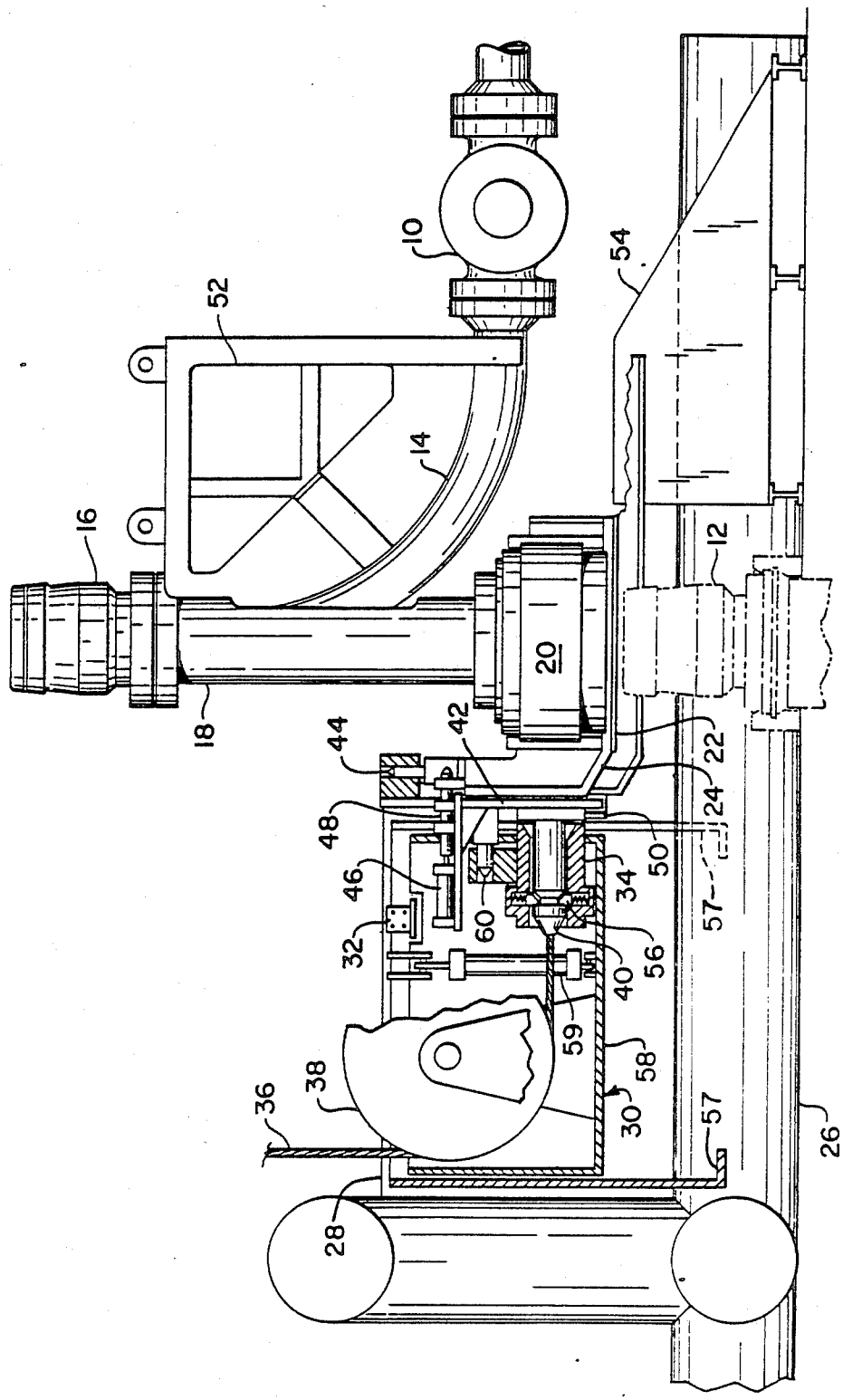
FIG. 1 is a partial sectional elevation with the riser mandrel held slightly above the anchor pile, before it is stroked downwardly.
Figure 2:
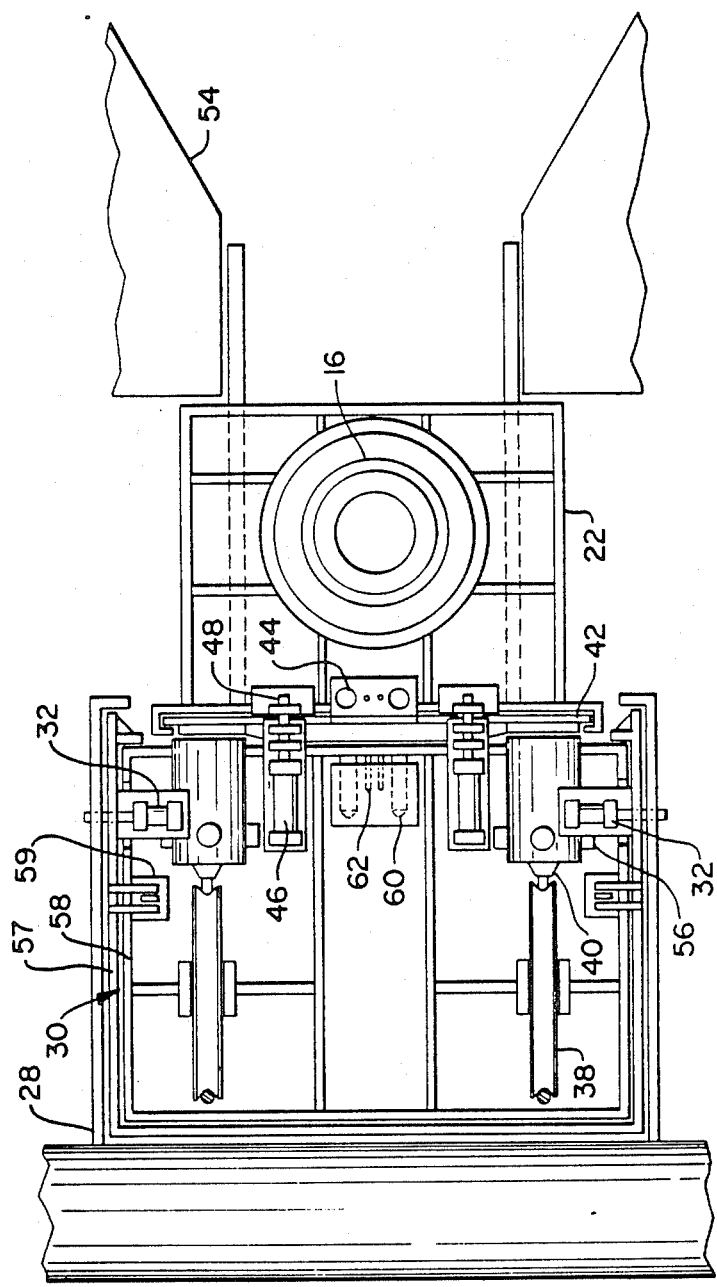
FIG. 2 is a sectional plan view through the apparatus.

In the production of oil to a floating platform the production from various subsea wellheads is brought to a common location and passed to the platform through a plurality of flowlines. These production flowlines are normally peripherally arranged around a central riser. On the surface the oil is degased and sent down through a central riser into a sales line which conveys the oil from this location to a point of distribution. The central riser also acts as a structural member, being tied to an anchor pile anchored to the seabed. Thus a sales line 10 is to be connected to an anchor pile 12.

At the end of the pipeline there is an elbow 14 connected to the sales riser mandrel 16 placing the pipeline in fluid communication with the upper end thereof. The sales riser mandrel also includes a cylindrical section 18 structurally connecting the upper portion to a lower anchor pile connector 20. This connector is adapted to be hydraulically locked onto the upper end of the sales riser anchor pile 12. A sled 22 includes the elbow, the sales riser mandrel, and the lower connector as well as a spacer 24. The sled may also include other structural members to aid in guidance during the pull-in as described hereinafter.

A template structure 26 is attached to the anchor pile 12 in the conventional manner. After the template is in position, the anchor pile is cemented in place. There is a predictable vertical and horizontal spaced relation between the anchor pile and the template. The template holds a tool supporting frame or pull-in tool receptacle 28 in a predetermined spaced relationship from the anchor pile.

A pull-in tool 30 is adapted to fit within the tool supporting receptacle 28 and to be locked in a predetermined location by means of locking cylinders 32. The tool includes alignment funnels 34 through which a pull-in cable 36 is threaded while the pull-in tool is at the surface. Sheaves 38 provide a means for guiding the cable through the funnel during the pull-in operation whereby an upward pull on the cable operates to pull the connected pipeline toward and into funnels 34.

After the cable is threaded through the pull-in tool the cable, while still at a surface location, is attached to alignment pins 40 of a bridle 42. As described in detail hereinafter, the bridle is initially attached to the pull-in sled; and after the pull-in and securing of the pipe is accomplished, it is released from the sled and remains attached to the pull-in tool for retrieval to the surface.

The bridle 42 is attached to the sled 22 through engagement of a stab connection 44 and a bridle locking cylinder 46 with its locking pin 48, as well as engagement with bracing plate 50 which forms a portion of the sled.

This connection of the cable to the bridle is made on a pipe laying barge, and the end of the pipe is lowered with the sled including a buoyancy module 52 which is designed to produce approximately a neutral buoyancy at the sale riser anchor pile depth. This is facilitated by the usual practice of attaching loose hanging chain to the pipeline to vary the weight thereof as the pipeline approaches the seabed.

At this point the pull-in operation begins with the pull-in cables being winched from a semi-submersible anchored over the template. As the pull-in bridle and sled combination nears the template, the sled begins to enter the guide ramp 54. As the sled is pulled in, the alignment pins 40 enter the alignment funnels 34. In order to facilitate this operation, the guide ramp provides at least lateral guidance with a considerable moment arm between the funnel location where the cable is pulling and the guided location on the opposite side of the anchor pile. This minimizes binding which could occur if the moment arm were taken only within the alignment pin at the alignment funnel location. The alignment is further facilitated if vertical guidance is supplied by the interaction between the guide ramp and the sled.

As the bridle is pulled into its final condition funnel locks, comprising spring loaded locking pins 56, engage the alignment pins and lock the bridle into place. Cable 36 may be slacked off at this time since these pins maintain the proper spacial relationship between the connector 20 and the pile 12 without relying on the pull-in cable.

The pull-in tool 30 includes an outer frame 57, and an inner frame 58. Stroking cylinders 59 connect these two frames and operate to stroke the portion of the tool carrying the funnel downwardly, and along with this carrying down the sled and the lower connector 20. This stroking enables the connector to be placed in the proper relationship with the pile 12 for locking of the connector. The locking cylinder 32 actually locks the outer frame 57 to the receptacle 28. This permits the stroking while still locking the pull-in tool 30 in place.

A hydraulic fluid supply is included in the pull-in tool, and a hydraulic stab connection 60 effects a fluid communciation between the pull-in tool and the bridle 42. A further hydraulic stab connection 44 establishes fluid communication between the bridle and the sled, with the two stab connections of the bridle being in fluid communication with one another. An internal fluid circuit through the sled connects the lower connector 20 to the hydraulic fluid from stab connection 44, so that this connector may be hydraulically activated and engaged permanently with the anchor pile 12.

The pull-in tool 30 has hydrostatic fluid conveying conduits therethrough. The sled 22 has a hydraulic fluid conveying conduit in communication with the pile connector 20. The hydraulic fluid conveying conduits of the pull-in tool are in fluid communication with the pile connector 20 when both stab connection 44 and 60 are engaged.

The remaining operation is the retrieval of the pull-in tool and the bridle to the surface. This is accomplished by hydraulically retracting the bridle locking cylinder 46. Hydraulic fluid for this is made available through stab connection 62. With cylinder 46 retracted, the bridle 42 disengages from the sled 22. The pull-in tool lock down cylinders 32 may then be retracted, and the bridle 42 together with pull-in tool 30 retrieved to the surface.

What is claimed is:

1. A pipeline pull-in apparatus for pulling in and securing a pipeline to a subsea anchor pile comprising: a tool supporting receptacle; a template structure, including means for spacing said receptacle at a predetermined location with respect to the anchor pile; a pull-in tool adapted to fit within said supporting receptacle; locking means for locking said pull-in tool to said receptacle at a predetermined location; at least one alignment funnel located on said pull-in tool; means for guiding a pull-in cable through said funnel; a sled secured to and carrying the end of the pipe to be secured; a lower anchor pile connector secured to said sled; a bridle attached to said sled; means for remotely detaching said bridle from said sled; at least one alignment pin mounted on said bridle and adapted to mate with said alignment funnel; and means for attaching a pull-in cable to said bridle.

2. An apparatus as in claim 1: having also vertical stroking means for stroking said lower anchor pile connector vertically with respect to said receptacle.

3. An apparatus as in claim 1: said pull-in tool comprising a first frame, and a second frame; said locking means arranged to lock said first frame to said receptacle; a vertical stroking means attached between said first and second frames; and said alignment funnel located on said second frame.

4. An apparatus as in claim 1: said sled having also; a sales riser mandrel having said lower connector located at its lower end, and the end of said pipeline located at its upper end, and including an elbow placing the upper end of said mandrel in fluid communication with the remainder of said pipeline.

5. An apparatus as in claim 1: wherein said pull-in tool has hydraulic fluid conveying conduits therethrough; hydraulically actuated locking means located on said lower connector; said sled having a hydraulic fluid conveying conduit in communication with said locking means; a stab connection between said bridle and said pull-in too; a stab connection between said bridle and said sled, the hydraulic fluid conveying conduits of said pull-in tool being in fluid communication with said hydraulic actuating locking means when both of said stab connections are engaged.

6. An apparatus as in claim 1: having also a buoyancy module attached to said sled and sized for approximately neutral buoyancy of the end of said pipeline when it is at the water depth of the anchor pile.

7. An apparatus as in claim 1: said bridle having hydraulically actuated unlatching means for releasing said bridle from said sled; a second stab connection between said pull-in tool and said bridle, said second stab connection establishing hydraulic fluid communication between said pull-in tool and said bridle, and said second stab connection being in fluid communication through said bridle with said unlatching means.

8. An apparatus as in claim 3: having also a funnel lock for locking said alignment pins within said funnel independent of the pull-in cable.

9. An apparatus as in claim 1: said locking means for locking said pull-in tool to said receptacle comprising; a hydraulically actuated cylinder located on said pull-in tool.

10. An apparatus as in any one of claims 1–9: having also a guide ramp attached to said template, and providing at least lateral guidance of said sled at a location on the opposite side of the anchor from said funnels.

11. An apparatus as in claim 2: said sled haviing also; a sales riser mandrel having said lower connector located at its lower end, and the end of said pipeline located at its upper end, and including an elbow placing the upper end of said mandrel in fluid communication with the remainder of said pipeline.

12. An apparatus as in claim 2, 3, or 8: wherein said pull-in tool has hydraulic fluid conveying conduits therethrough; hydraulically actuated locking means located on said lower connector; said sled having a hydraulic fluid conveying conduit in communication with said locking means; a stab connection between said bridle and said pull-in tool; a stab connection between said bridle and said sled, the hydraulic fluid conveying conduits of said pull-in tool being in fluid communication with said hydraulic actuating locking means when both of said stab connections are engaged.

13. An apparatus as in claim 2 or 3: having also a buoyancy module attached to said sled and sized for approximately neutral buoyancy of the end of said pipeline when it is at the water depth of the anchor pile.

14. An apparatus as in claim 2 or 3: said bridle having hydraulically actuated unlatching means for releasing said bridle from said sled; a second stab connection between said pull-in tool and said bridle, said second stab connection establishing hydraulic fluid communication between said pull-in tool and said bridle; and said second stab connection being in fluid communication through said bridle with said unlatching means.

15. An apparatus as in claim 2 or 3: said sled having also; a sales riser mandrel having said lower connector located at its lower end, and the end of said pipeline located at its upper end, and including an elbow placing the upper end of said mandrel in fluid communication with the remainder of said pipeline; said pull-in tool having hydraulic fluid conveying conduits therethrough; hydraulically actuated locking means located on said lower connector; said sled having a hydraulic fluid conveying conduit in communication with said locking means; a stab connection between said bridle and said pull-in tool; a stab connection between said bridle and said sled, the hydraulic fluid conveying conduits of said pull-in tool being in fluid communication with said hydraulic actuating locking means when both of said stab connections are engaged; and a buoyancy module attached to said sled and sized for approximately neutral buoyancy of the end of said pipeline when it is at the water depth of the anchor pile.

16. An apparatus as in claim 15: said bridle having hydraulically actuated unlatching means for releasing said bridle from said sled; a second stab connection between said pull-in tool and said bridle, said second stab connection establishing hydraulic fluid communication between said pull-in tool and said bridle, and said second stab connection being in fluid communication through said bridle with said unlatching means; a funnel lock for locking said alignment pins within said funnel independent of the pull-in cable; and a guide ramp attached to said template, and providing at least lateral guidance of said sled at a location on the opposite side of the anchor from said funnels.

17. An apparatus as in claim 16: said locking means for locking said pull-in tool to said receptacle comprising; a hydraulically actuated cylinder located on said pull-in tool.

18. The method of pulling in and securing the end of a pipeline to an anchor of a production system comprising: threading a pull-in cable through a pull-in tube; lowering said pull-in tool and locking said pull-in tool at a predetermined location with respect to said anchor; attaching a bridle to the end of the pipe to be connected; attaching the end of the pull-in cable to said bridle; drawing said bridle into engagement with said pull-in tool; thereafter moving said pipe end with respect to said pull-in tool into locked engagement with said anchor; remotely disengaging said bridle from said pipe end; and recovering said bridle attached to said running tool.

* * * * *